May 28, 1929.　　　　N. A. HALLWOOD　　　　1,714,871
SCALE
Filed Feb. 2, 1927
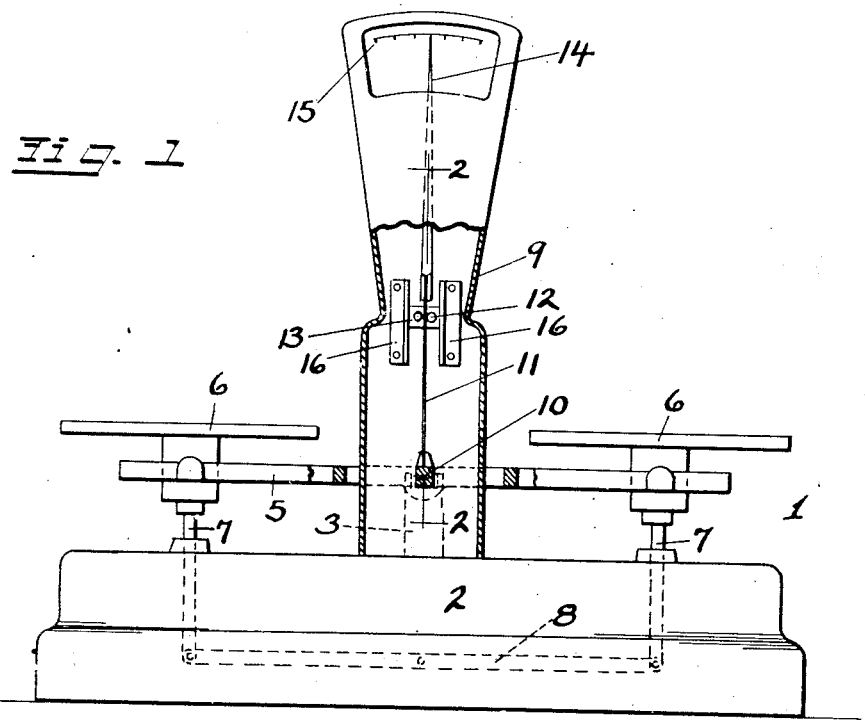
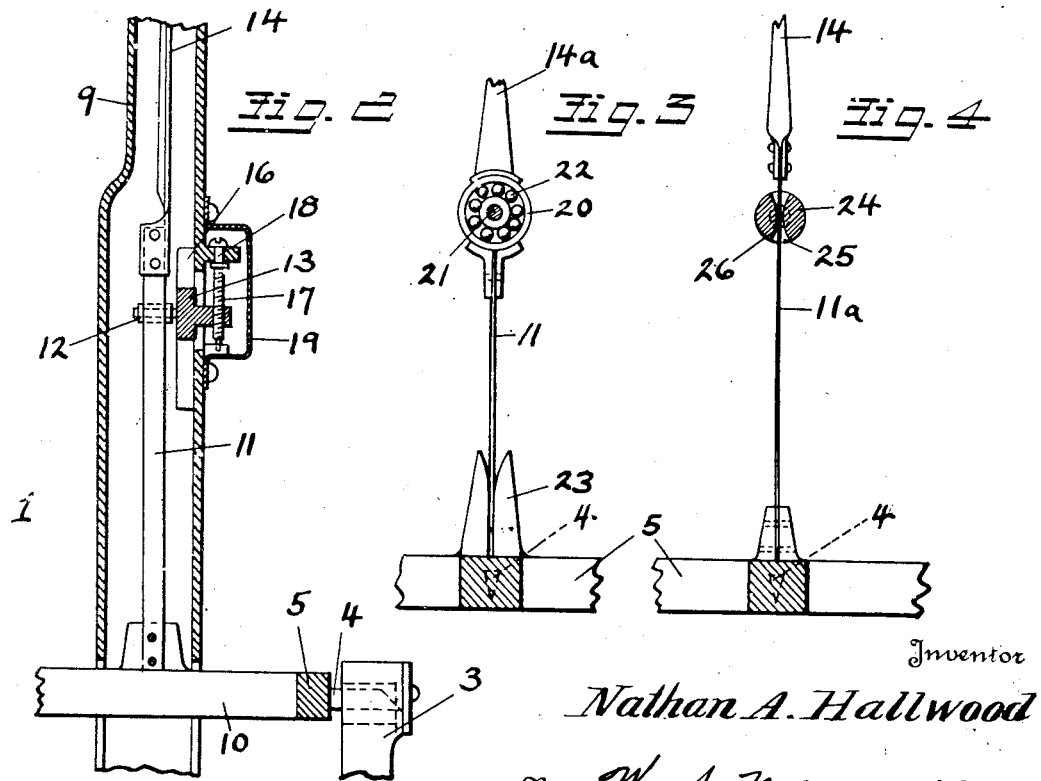
Inventor
Nathan A. Hallwood
By W. S. McDowell.
Attorney Patented May 28, 1929.

1,714,871

UNITED STATES PATENT OFFICE.

NATHAN A. HALLWOOD, OF COLUMBUS, OHIO, ASSIGNOR TO THE JACOBS BROS. CO., INC., OF BROOKLYN, NEW YORK, A CORPORATION OF NEW YORK.

SCALE.

Application filed February 2, 1927. Serial No. 165,478.

This invention relates to a functionally and structurally improved scale and specifically aims to provide a device of this character in which over and underweights will be registered. The invention will be hereinafter exemplified by an even balance type of scale in connection with which it is primarily to be used, but it is to be understood that this is not necessarily the case.

It is a further object of the invention to provide a scale of the character set forth which will constitute an improvement upon scales of this general type hitherto employed by first simplifying the construction of the weight indicating mechanism, second providing a more accurate weight reading means and third in reducing the mechanical complications, enabling the scale to be readily manufactured and kept for long periods of time in perfect operation with but a minimum of attention and replacement, adjustment or breakage of parts.

With these and other objects in view, as will appear as the description proceeds, the invention consists in the novel features of construction, combinations of elements and arrangements of parts hereinafter set forth and fully described and pointed out in the appended claims.

In the accompanying drawing:

Figure 1 is a front elevation of a scale constructed in accordance with the present invention, parts thereof being shown in vertical section, Figure 2 is a vertical transverse sectional view taken on the line 2—2 of Figure 1, and Figures 3 and 4 are front views, partly in vertical section, disclosing modified forms of the invention.

Referring more particularly to the drawing the numeral 1 designates my improved scale in its entirety. Broadly, the scale comprises a base 2 from which arise supporting bearings 3, which are adapted for the reception of the knife edge fulcrums 4 projecting horizontally from the intermediate portions of a beam 5. The outer ends of the beams carry in the usual manner the equidistantly spaced weight receivers 6, from which depend stems 7, the lower ends of the latter being connected with a pivoted check rod 8, arranged in the base of the scale and extending parallel with the beam 5.

The weight indicating mechanism comprises a tower 9, arising from the base 2 between the weight receiver 6. The beam 5 is provided with a centrally disposed integral web 10, arranged within the base of the tower. In this instance the web includes spaced ears to which are rigidly secured the lower end of a resilient strip 11, arranged vertically within the tower and extending transversely thereof. The upper portion of the strip passes between a pair of adjustable guide rollers 12 mounted in connection with a vertically adjustable carriage 13. The extreme upper end of the resilient metallic strip 11 is connected rigidly with the lower end of an indicator hand 14, which is movable over a graduated surface 15 provided in the top of the tower 9.

By this construction it will be seen that when the scale is unweighted, the resilient strip 11 assumes its normal straight position, holding the beam in what may be termed its normal position and at the same time causing the outer end of the hand 14 to maintain itself on the zero positions of the graduated surface 15. Upon the application of a weight to one of the other of the receivers 6, the beam will be rocked from its normal or neutral position thereby causing the spring strip 11 to flex or bow. This is brought about by the fact that the lower end of the strip 11 is connected with the beam at a position somewhat eccentric to the true horizontal axis of rotation of the beam. Then, since the upper end portion of the spring strip is confined loosely between the rollers 12 it follows that the spring will be bowed. The bowing of the spring causes the hand 14 to traverse the scale or graduated surface 15 so as to provide the scale operator with a reading to denote the extent of departure of the beam from the desired normal position. When the beam, however, is balanced the resiliency of the strip 11 causes the same to regain its straight vertical form and this will be indicated by the position of the outer end of the hand 14 on the graduated surface 15. It will be observed that the strip is comparatively long and that the bending forces and movements to which the same is subjected are comparatively unimportant from a mechanical standpoint. This enables the strip to be employed for long periods of time without fatigue, strain or wear which would tend to impair the accuracy of the weight indicating mechanism of which the spring forms an essential part. It will be observed that the spring is not subjected to undue torsional strains or twists, but merely to a slight bending action which the nature of the spring is readily capable of absorbing the relatively slight variation in position without serious crystallization of the metal of which the strip is composed or loss of the true working position of the strip.

To adjust the throw of the upper end of the strip the rollers 12 are carried upon studs mounted upon the travelling carriage or block 13. This block is received within vertical guides 16 carried in connection with the tower and is provided with a bracket having a threaded opening formed therein for the reception of a vertically adjusting screw 17, which is swiveled as at 18 in connection with the tower. A removable casing 19 is arranged to cover the screw 17 and associated parts, but may be readily removed in order to provide access to said screw whenever desired. It will be seen that by rotating the screw 17 the carriage or block will be caused to travel vertically in its associated guides, thereby raising or lowering the rollers 12. This results in providing a control for governing the degree of flexure of the spring strip and particularly the extent of movement of the upper end of said strip from one side to the other of the perpendicular plane which said strip normally occupies. This adjustment provides a scale indicating mechanism of a sensitive accurate character and one of very economical form, since extreme accuracy in workmanship in the building of the scale is not required, especially so far as the weight indicating mechanism itself is concerned.

In Figures 3 and 4 slight modifications of the invention have been set forth. In Figure 3 the indicating hand 14$^a$, is provided with an enlarged hub 20 arranged for rotation about a fixed axially disposed shaft 21, there being anti-friction devices 22 arranged between the hub and the shaft to permit of frictionless rotation of the hand 14$^a$. The lower side of the hub 20 is provided with a pair of brackets 23, between which is secured the upper end of the strip 11$^a$, the lower portion of the latter being clamped to the beam 5 in the usual manner. In Figure 4 exactly the same construction is employed as is shown in the preferred form of the invention, set forth in Figures 1 and 2, with the exception that instead of employing a pair of spaced guide rollers, as indicated at 12, I use a transverse stud 24 provided with a slot 25 through which the strip 11 extends, the walls of the slot being convex as indicated at 26. The stud 24 may turn about a horizontal axis to relieve possible binding.

In view of the foregoing it will be seen that the present invention provides a scale of simple and economical form, capable of accurately and clearly disclosing the various weighing positions of the beam, and wherein the movement of the hand or pointer of the weight indicating mechanism is multiplied with respect to the degree of movement of the beam. The weight indicating mechanism may be readily adjusted so as to be sensitive and accurate in use, a structure of long life provided and repairs, when necessary, simplified and rendered convenient to effect. Friction has been kept out of the scale to a very considerable extent and error from this source reduced to a minimum.

Thus, among others, the several objects specifically aforementioned are achieved. It will be understood, however, that numerous changes in construction and re-arrangement of the parts might be resorted to without in the slightest departing from the spirit of the invention as defined by the claims.

What is claimed is:

1. In a scale, a base, a pivotally mounted beam arranged on the base, a perpendicularly extending spring connected with said beam, a weight indicator carried by said spring, and an adjustable guide means engaging with said spring at a position spaced from said beam and serving to flex said spring upon oscillating movement on the part of said beam.

2. In a scale, a base, a pivotally mounted beam carried by said base, a flat leaf spring having one end thereof connected with said beam in alignment with the pivotal axis of the latter, the other end of said spring having fixed connection with a weight indicator, and guide means engaging with said spring at a position spaced from said beam and serving to flex said spring upon oscillation on the part of said beam.

3. In a scale, a beam pivotally mounted contiguous to the center thereof, an upright leaf spring having the lower end thereof clamped to said beam contiguous to the pivotal mounting thereof, the outer end of said spring being formed to include a weight indicator, and guide means mounted independently of said beam and cooperative with said spring to flex the latter upon movement of said beam from a normal position, the flexing of said spring serving to move said indicator over a graduated surface.

4. In a scale, a pivotally mounted even balanced beam, a flexible member extending perpendicularly to said beam and having the lower portion thereof rigidly connected with said beam, the upper end of said flexible member being formed to constitute a weight indicator, and means for confining the upper portion of said flexible member to cause flexure thereof upon movement of said beam away from a normal position.

5. In a scale, a pivotally mounted evenly balanced beam, a flexible strip having the lower end thereof secured to said beam contiguous to the axis of rotation thereof, the free end of said strip being formed to comprise a weight indicator, and means admitting of the flexing of said strip when said beam is moved from a predetermined normal position.

6. In a scale, a pivotally mounted beam structure, a weight indicating mechanism comprising a flexible strip, and means operating upon deflection of said beam structure from a neutral position to flex said strip, the free end of said strip being movable over a graduated surface to indicate the departure thereof from a normal position.

7. In a scale, a pivotally mounted even balanced beam, a resilient metallic strip connected at its lower end with said beam in registration with the pivotal center thereof, the upper end of said strip being formed to constitute a weight indicating member, and a guide structure including a pair of opposed convex walls between which said strip is passed, whereby upon oscillation of said beam said strip will be flexed to move the weight indicating member thereof.

8. In a scale, a pivotally mounted even balanced beam, a movable weight indicator, and a spring strip positioned between said beam and said indicator and adapted to be flexed when said beam is moved from a neutral position, the flexure of said spring strip serving to operate said indicator, said indicator swinging about a horizontal axis.

9. In a scale, a pivotally mounted even balanced beam, a spring strip connected at its lower end to the axial portion of said beam, the free upper end of said strip being formed to include a weight indicator, and an adjustable guide means engaging with said strip at positions spaced from said beam and serving to admit of the flexing of said strip upon deflection of said beam from a normal predetermined position.

10. In a scale, a pivotally mounted beam, a spring strip connected with said beam, said strip extending perpendicularly to said beam and having the outer end thereof formed to constitute a weight indicator, and an adjustable guide means cooperative with said strip at positions spaced from said beam to effect the flexing of said strip when said beam is moved from a predetermined normal position.

11. In a scale, a pivotally mounted even balanced beam, a check, a flexible strip, an adjustable guide means engaging with the strip, and a connection between the lower end of said strip and a member movable in unison with either said beam or check.

12. A scale including a rockingly mounted beam, a flexion strip, means connecting one end of said strip to move with said beam, and substantially fixed means movably cooperating with said strip to normally maintain said beam in a predetermined position.

13. A scale including a rockingly mounted beam, a flexion strip, means connecting one end of said strip to move with said beam, substantially fixed means movably cooperating with said strip to normally maintain said beam in a predetermined position and a registering means connected with that end of the strip opposite to the one which is connected to said beam.

14. A scale including a rockingly mounted beam having a substantially predetermined range of travel and a neutral position, a registering mechanism to measure the amount of deflection of said beam to either side of said neutral position, means connecting said mechanism to said beam and means for varying the range of travel of said registering mechanism to both sides of the neutral position thereof.

15. A scale including a rockingly mounted beam, a flexion strip, a registering mechanism connected with said flexion strip, means connecting said beam to said flexion strip and means for varying the amount of deflection of said strip under predetermined movements of said beam.

16. A scale including a rockingly mounted beam having a neutral position, a registering mechanism indicating the amount of deflection of said beam to either side of said neutral position, a flexion strip tending normally to maintain said beam in such position and means for varying the range of movement of said registering mechanism.

17. A scale including a rockingly mounted beam, a flexion strip connected thereto, a registering mechanism for measuring the amount of deflection of said beam from a predetermined position and readily adjustable means movable longitudinally of said strip for varying the latitude of flexion thereof under predetermined movements of said beam.

18. A scale including a rockingly mounted beam, a flexion strip connected thereto and readily adjustable means engaging said strip and movable longitudinally thereof to vary the effective reaction of said strip to movements of the beam.

19. A scale including a rockingly mounted beam having a neutral position, a flexion strip connected to said beam and tending to maintain said beam in neutral position and readily adjustable means engaging said strip to vary the amount of resistance offered thereby to movements of said beam to positions to either side of such neutral position.

20. A scale including a rockingly mounted beam having a neutral position, a flexion strip connected to said beam and tending to maintain said beam in neutral position, readily adjustable means engaging said strip to vary the amount of resistance offered thereby to movements of said beam to positions to either side of such neutral position and a registering mechanism connected with said flexion strip to measure the amount of deflection of the beam to positions to either side of neutral.

In testimony whereof I affix my signature.

NATHAN A. HALLWOOD.